United States Patent [19]

Hansen et al.

[11] Patent Number: 5,548,492
[45] Date of Patent: Aug. 20, 1996

[54] SLIDE-OUT FIBER-OPTIC ILLUMINATED VANITY MIRROR

[75] Inventors: Scott A. Hansen, Holland; Russell L. Clark, West Olive, both of Mich.

[73] Assignee: Prince Corporation, Holland, Mich.

[21] Appl. No.: 420,699

[22] Filed: Apr. 12, 1995

[51] Int. Cl.⁶ .................................................. B60Q 3/021
[52] U.S. Cl. ........................... 362/83.1; 362/32; 362/74; 362/140; 296/97.2
[58] Field of Search ............................. 362/32, 135, 136, 362/140, 142, 143, 144, 83.1, 74; 296/97.2, 97.4, 97.11; 359/844

[56] References Cited

U.S. PATENT DOCUMENTS

| | | | |
|---|---|---|---|
| 4,314,314 | 2/1982 | Hubner | 362/135 |
| 4,486,819 | 12/1984 | Marcus et al. | 362/142 |
| 4,792,884 | 12/1988 | Suman et al. | 362/135 |
| 4,922,384 | 5/1990 | Torrence | 362/32 |
| 4,988,140 | 1/1991 | Van Order | 296/97.2 |
| 5,005,108 | 4/1991 | Pristash et al. | 362/32 |
| 5,136,480 | 8/1992 | Pristash et al. | 362/32 |
| 5,184,888 | 2/1993 | Sakuma et al. | 362/83.1 |
| 5,192,110 | 3/1993 | Mykytiuk et al. | 296/97.4 |

*Primary Examiner*—Denise L. Gromada
*Assistant Examiner*—Y. Quach
*Attorney, Agent, or Firm*—Price, Heneveld, Cooper, DeWitt & Litton

[57] ABSTRACT

A vanity mirror assembly includes a relatively thin panel which can slide out from a vehicle support housing. The panel supports a mirror illuminated by a fiber-optic lighting assembly. The fiber-optic lighting assembly comprises a light source which is fixedly positioned within a vehicle housing and to which at least one or more fiber-optic cables are optically coupled and extend to the panel for directing illumination therefrom. The fiber-optic cables have a length and are flexible to allow the panel to be moved from a stored position within the vehicle housing to an extended use position. Also in the preferred embodiment of the invention, the widened ends of the fiber-optic cables have a rectangular surface textured to direct illumination outwardly in a direction orthogonal to the longitudinal axis of the fiber-optic cables.

13 Claims, 2 Drawing Sheets

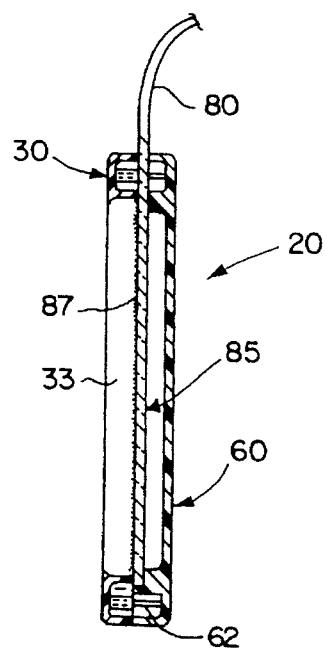
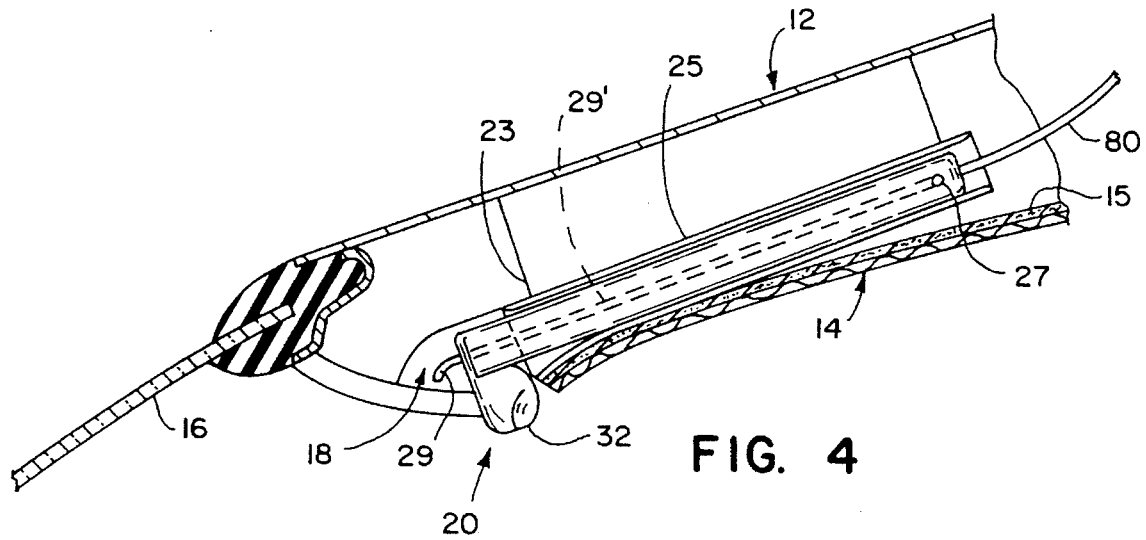

5,548,492

SLIDE-OUT FIBER-OPTIC ILLUMINATED VANITY MIRROR

BACKGROUND OF THE INVENTION

The present invention relates to an illuminated vanity mirror and particularly to a slide-out illuminated vanity mirror packaged for a vehicle visor employing fiber-optic illumination.

Illuminated vanity mirror visors have become popular accessories on many vehicles and provide the user with a convenient vanity mirror location and one which can be employed under low ambient light conditions for applying makeup. Some visors include slide-out illuminated vanity mirror packages which, when extended, can be pivoted to direct illumination not only for use of the vanity mirror but also for directing illumination to the interior of the vehicle as, for example, map reading and other general illumination functions. One such illuminated vanity mirror assemblies is disclosed in U.S. Pat. No. 4,486,819. Such vanity mirror visors, while providing the advantages of a pull-out and directable source of illumination independent of the visor position, requires a somewhat large visor package. As vehicle headliners recede, with modern vehicle windshields becoming increasingly larger, a large visor is difficult to employ in the compact space required. As a result, it is desirable to provide a thin illuminated vanity mirror visor and one which has the desirable characteristics of existent vanity mirror assemblies but which requires less space.

SUMMARY OF THE INVENTION

The vanity mirror assembly of the present invention satisfies these requirements by providing a relatively thin panel which can slide out from a vehicle support housing, such as a headliner, with panel providing illumination by means of a fiber-optic lighting assembly. In a preferred embodiment of the invention, the fiber-optic lighting assembly comprises a light source which is fixedly positioned within a vehicle housing and to which at least one or more fiber-optic cables are optically coupled and extend within the panel for directing illumination therefrom. The fiber-optic cables have a sufficient length and are flexible to allow the panel to be moved from a stored position within the vehicle housing to an extended use position. Also in the preferred embodiment of the invention, the widened ends of the fiber-optic cable define a rectangular textured light emitting surface to direct illumination in a direction orthogonal to the longitudinal axis of the fiber-optic cable.

The fiber-optic lighting assembly and panel can be employed as a slide-out visor which extends from behind the headliner of a vehicle. A vanity mirror may be positioned between two such fiber-optic light sources to provide an illuminated vanity mirror visor. In one embodiment of the present invention, the visor mirror can be selectively covered by an electrically actuated light controlling member.

The resultant vanity mirror package is a relatively thin panel which can be employed in modern vehicle interiors and one which can provide a slide-out vanity mirror visor with a directable source of illumination. These and other features, objects and advantages of the present invention will become apparent upon reading the following the description thereof, together with reference to the accompanying drawings.

BRIEF DESCRIPTION OF THE DRAWINGS

FIG. 3 is an enlarged, cross-sectional, assembled view of the illumination means taken through section III—III of FIG. 2; and FIG. 4 is an enlarged, cross-sectional view of the visor assembly shown in FIG. 1, taken along section lines IV—IV of FIG. 1.

DETAILED DESCRIPTION OF THE PREFERRED EMBODIMENT

Figure 1:
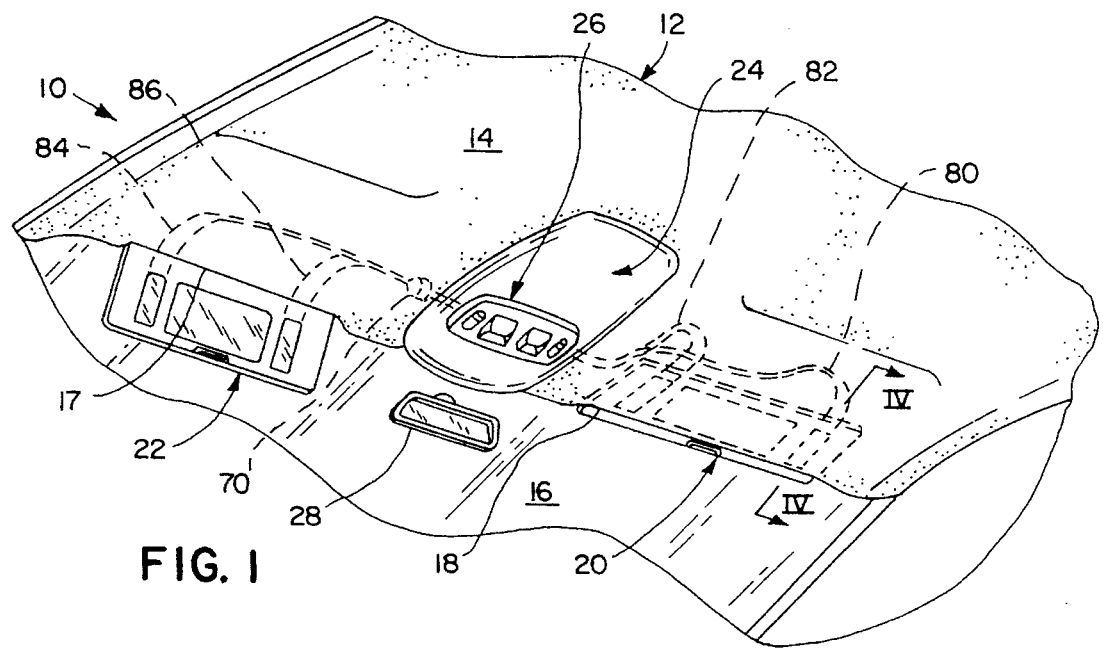
FIG. 1 is a fragmentary, perspective view of the interior of a vehicle showing a pair of illuminated vanity mirror visors embodying the present invention.

Referring initially to FIG. 1, there is shown a vehicle 10, such as an automobile, which includes a roof 12 having a molded headliner assembly 14 mounted to the interior thereof and terminating in spaced relationship at the edge of windshield 16 to define a pair of slots 17, 18 along the front windshield area for the slide-out mounting of a pair of substantially identical visor assemblies 20, 22. Also mounted within the interior of the vehicle is an overhead console assembly 24 which may optionally include a map lamp assembly 26, garage door opening transmitters, a compass and display or other accessories typically mounted within such overhead consoles. A rearview mirror assembly 28 is also mounted to windshield 16 between the visor assemblies 20, 22.

In FIG. 1, visor assembly 20 is shown in a retracted, stored position behind the vehicle headliner 14, while visor 22 is shown in an extended, use position. The relatively thin visor assemblies 20, 22 can be mounted in a variety of manners in a housing of the vehicle but preferably are mounted in the space between the sheet metal roof 12 of the vehicle and the upper surface 15 of headliner 14 (FIG. 4). One such mounting structure is the utilization of a pair of spaced, molded, lubricous U-shaped polymeric tracks 25, as best seen in FIG. 4, which extend along opposite edges of the visors for guidedly supporting opposite ends and allowing the visor to move from the stored position shown downwardly and outwardly through slot 18, for example, in connection with visor 20 for use. The end of tracks 25 are proximate windshield 16 and may include a suitable stop 29 in a pin receiving slot 29' of tracks 25, such that a pivot pin 27 on opposite edges of each of the visor assemblies 20 and 22 riding in slots 29' prevent the visor from being removed from the tracks 25 and allow the visors to pivot to various adjusted positions once extended from the headliner 14. Tracks 25 can be mounted to roof 12 by suitable brackets 23. Each of the visor assemblies 20, 22 are identical, therefore, a description of only visor assembly 22 follows in connection with FIGS. 2 and 3.

Figure 2:
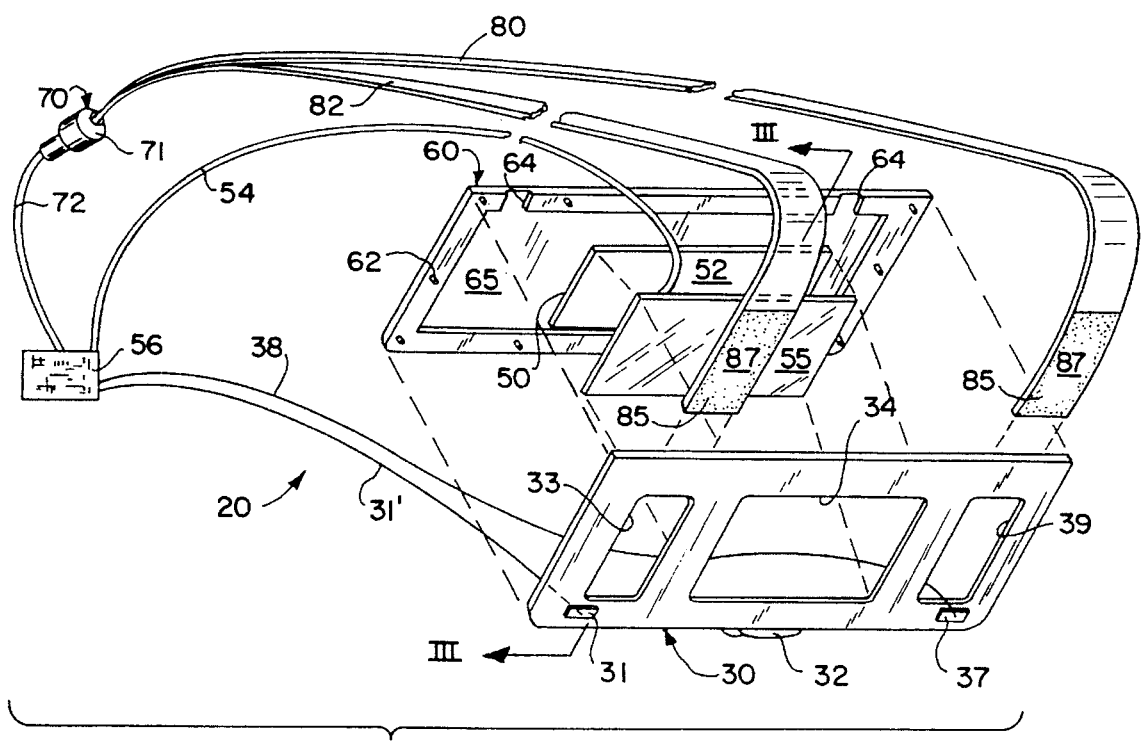
FIG. 2 is a greatly enlarged, exploded, perspective view of one of the vanity mirror assemblies embodying the present invention.

Referring now to FIGS. 2 and 3, the planar visor assembly 20 comprises a compound panel including a front panel 30 having centered along its lower edge a pull out handle 32 for the easy control of the visor assembly so defined. Front panel 30 includes a central, rectangular opening 34 for selectively exposing a vanity mirror 50 which is adhesively mounted to a rear panel 60 to which panel 30 is secured by any suitable manner, such as by interengaging snap-locking posts 62 extending forwardly from rear panel 60 into mating apertures formed in the rear surface of panel 30. An electrochromic or LCD controllable cover 55 extends between the front surface 52 of mirror 50 and opening 34 and receives electrical control signals by electrical conductors 54 coupled to an electrical control circuit 56, which can be remotely located in console 24 of the headliner. A control switch 31 is mounted to panel 30 and electrically coupled to circuit board 56 via conductors 31' for controlling the opacity of cover panel 55 to selectively expose the mirror 50 as desired. Thus, mirror 50 is visible only when desired to be used and can be controlled independently of the illumination means for the visor assembly 20. The details of the construction and control of the electronically controllable cover 55 is disclosed in greater detail in U.S. Pat. No. 4,988,140, issued on Jan. 29, 1991; the disclosure of which is incorporated herein by reference.

The illumination means for each of the visor assemblies 20, 22 preferably comprises a single light source 70 which, as seen in FIG. 1, can be located behind and fixedly mounted to the console 24 in the space behind the headliner 14. Light source 70 receives electrical operating power from circuit board 56 through a pair of electrical supply conductors 72, as seen in FIG. 2. An electrical control switch 37 mounted to front visor panel 30 is coupled to control panel 56 by means of conductor 38 and can be employed for providing operating power for the light source 70. Source 70 includes a high intensity source of light contained within a cylindrical housing 71 from which there extends a plurality of fiber-optic cables 80, 82 extending into visor assembly 20 and cables 84, 86 extending into visor assembly 22. The fiber-optic cables 80, 82, 84, 86 are wide braided fiber-optic filaments having ends 85 with rectangular surfaces 87 which are textured by sandblasting or otherwise roughing their surfaces such that illumination from source 70 projects orthogonally outwardly from surfaces 87 of the fiber-optic cables. Surfaces 87 are aligned behind rectangular openings 33, 39 in spaced relationship on opposite sides of mirror opening 34 in front panel 30. The flattened ends 85 of each of the fiber-optic cables can be mounted behind apertures 33, 39 of panel 30 by providing mounting slots 64 in the front surface 65 of rear panel 60 and are held in place by the sandwiched assembly of panels 30 and 60 which similarly holds cover 55 and mirror 50 in place.

The fiber-optic cables 80, 82, 84, 86 are braided fiber-optic filaments to provide flexibility and have a length sufficient to allow the cables to fold in the space between the headliner and the roof of the vehicle when retracted, such as visor assembly 20 shown in FIG. 1, and extend to a more straightened condition as shown by extended visor assembly 22 in FIG. 1. The braided fiber-optic cable so formed provides such flexibility and has a length sufficient to extend from light source 70 to the visor panels and allow their extension and retraction within the vehicle roof. The light source 70 and fiber optic cables extending therefrom are commercially available from Serigraph Inc. of West Bend, Wis., or from other suitable suppliers of fiber-optic illumination systems. Each of the panels 30 and 60 can be molded of a suitable polymeric material, such as polycarbonate, ABS or the like. Since the mirror 50, cover 55 and ends 85 of the fiber-optic bundles are relatively thin, the panels themselves can be relatively thin so that the overall thickness of the visor so defined may only be approximately one half inch or less.

Such a relatively thin illuminated vanity mirror visor with its electronic cover is ideally suitable for modern vehicle designs in which the head room for conventional visor assembly is not readily available. Although a single light source 70 is shown in the preferred embodiment of the invention as can be appreciated, each visor assembly may include an independent light source. In some embodiments the cover 55 can be eliminated and circuit board 56 can be eliminated with switch 31 coupled directly to light source 70 through suitable power supplying conductors. Also, although the illuminated mirror assembly of the present invention performs the function of providing an illuminated vanity mirror integrated into a slide-out visor panel, it will be appreciated that other vehicle locations and housings for such relatively thin illuminated vanity mirrors may also be desirable.

Various modifications to the preferred embodiment of the invention can be made without departing from the spirit and scope thereof as defined by the appended claims.

The embodiments of the invention in which an exclusive property or privilege is claimed are defined as follows:

1. An illuminated vanity mirror visor assembly comprising:
    a visor defined by a panel, said panel including a mirror mounted thereto and at least one elongated fiber-optic cable having one end extending to said panel and located in a position adjacent said mirror; and
    a light source coupled to said fiber-optic cable remote from said one end of said cable for supplying illumination for said mirror wherein said one end of said fiber-optic cable extending into said panel has a textured, planar surface means positioned for directing illumination outwardly from said planar surface in a direction generally orthogonal to said mirror.

2. The visor assembly as defined in claim 1 wherein said panel includes a pair of fiber-optic cables extending on opposite sides of said mirror.

3. The visor assembly as defined in claim 3 further including an electrically controlled cover positioned in front of said mirror.

4. The visor assembly as defined in claim 1 wherein said panel comprises a rear panel and said visor further includes a front panel, and wherein said mirror and said fiber-optic cable are positioned between said front and rear panels.

5. The visor assembly as defined in claim 4 wherein said fiber-optic cable comprises a bundle of braided fiber-optic filaments.

6. The visor assembly as defined in claim 5 and further including a guide track mounted to a vehicle roof receiving said panel to provide a slide-out mounting of said panel.

7. An illuminated vanity mirror for a vehicle comprising:
    a panel including a mirror and a pair of fiber-optic cables, each having one end extending to said panel and having a planar light emitting end with a textured, planar surface means position for directing illumination outwardly from said panel in a direction generally orthogonal to said mirror, said light emitting ends positioned adjacent opposite sides of said mirror, and a second panel having openings exposing said mirror and said light emitting ends of said fiber-optic cables, wherein said mirror and said fiber-optic cables are located between said panel and said second panel;
    a light source coupled to another end of said fiber-optic cable remote from said one end of said cable for supplying illumination for said mirror;
    a cover mounted between said panel and said second panel in alignment with said mirror covering said mirror; and
    a housing including means for movably coupling said vanity mirror to said housing for selectively storing said vanity mirror when not in use wherein said housing includes a headliner of a vehicle.

8. A vanity mirror visor for a vehicle comprising:

a first generally rectangular panel;

a mirror positioned on said first panel;

at least one elongated fiber-optic cable having a textured widened end positioned for emitting light in a direction orthogonal to said mirror;

a second panel including openings exposing said mirror and said end of said fiber-optic cable, said first and second panels coupled together holding said mirror and fiber-optic cable between said panels;

a vehicle housing, associated with said panels, an having a first side facing interior of a vehicle when installed in a vehicle; and a light source coupled to said fiber-optic cable remote from said widened end, said light source mounted on a side of said vehicle housing opposite said first side.

9. The vanity mirror visor as defined in claim 8 wherein said light source is fixedly mounted to said vehicle housing and said visor defined by said first and second panels is slideably mounted to said housing, said fiber-optic cable having a length and flexibility sufficient to allow said visor to move to a position extended from said housing.

10. The vanity mirror visor as defined in claim 9 wherein said housing includes a vehicle headliner.

11. The vanity mirror visor as defined in claim 10 and further including guide tracks mounted to said headliner slidably supporting opposite edges of said panels.

12. The vanity mirror visor as defined in claim 8 including a pair of fiber-optic cables extending on opposite sides of said mirror and wherein said openings in said second panel include openings exposing ends of said pair of cables.

13. The vanity mirror visor as defined in claim 12 and further including a cover for said mirror.

* * * * *

UNITED STATES PATENT AND TRADEMARK OFFICE
CERTIFICATE OF CORRECTION

PATENT NO.  : 5,548,492
DATED       : August 20, 1996
INVENTOR(S) : Hansen et al.

It is certified that error appears in the above-identified patent and that said Letters Patent is hereby corrected as shown below:

Column 4, line 32;

"claim 3" should be --claim 2--.

Column 5, line 11;

Delete "an".

Column 5, line 12;

After "facing" insert --an--.

Signed and Sealed this

Third Day of December, 1996

BRUCE LEHMAN

*Attest:*

*Attesting Officer*   *Commissioner of Patents and Trademarks*